(12) United States Patent
Kishita et al.

(10) Patent No.: US 10,293,882 B2
(45) Date of Patent: May 21, 2019

(54) ELECTRICALLY POWER ASSISTED BICYCLE

(71) Applicant: YAMAHA HATSUDOKI KABUSHIKI KAISHA, Iwata-shi, Shizuoka (JP)

(72) Inventors: Hirokatsu Kishita, Shizuoka (JP); Toshio Koga, Shizuoka (JP); Yuki Matsumoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 120 days.

(21) Appl. No.: 15/704,107

(22) Filed: Sep. 14, 2017

(65) Prior Publication Data

US 2018/0072373 A1    Mar. 15, 2018

(30) Foreign Application Priority Data

Sep. 15, 2016   (JP) ................................. 2016-180401

(51) Int. Cl.
  *B62M 6/45*       (2010.01)
  *B62M 6/55*       (2010.01)
  (Continued)

(52) U.S. Cl.
  CPC ................ *B62M 6/45* (2013.01); *B62M 6/40* (2013.01); *B62M 6/55* (2013.01); *B62M 6/80* (2013.01); *B62M 6/90* (2013.01)

(58) Field of Classification Search
  CPC . B62M 6/45; B62M 6/40; B62M 6/55; B62M 6/80; B62M 6/90
  See application file for complete search history.

(56) References Cited

U.S. PATENT DOCUMENTS

2012/0109436 A1*  5/2012  Saida .................. B60L 15/2054
                                                   701/22
2012/0316710 A1* 12/2012  Saida ...................... B62M 6/45
                                                   701/22

(Continued)

FOREIGN PATENT DOCUMENTS

JP        2002-329391 A     11/2002
JP        2002-362471 A     12/2002
(Continued)

OTHER PUBLICATIONS

Suzhou Kunteng Electronics Co. Ltd., "User Handbook for KT_LCD Exclusive Apparatus of Electric-Aided Bicycle"; May 10, 2011; 1 page.

*Primary Examiner* — Kevin Hurley
*Assistant Examiner* — Gabriela C Craciun
(74) *Attorney, Agent, or Firm* — Keating and Bennett, LLP

(57) ABSTRACT

An electrically power assisted bicycle includes a driving system including an electric motor that generates an assist force to assist human power of a rider and a first controller configured or programmed to control an operation of the electric motor; and an operation panel including buttons and a second controller. The buttons include a power button that turns on or off a power of the driving system, and an assist force setting button that sets an assist force of the electric motor. The second controller detects a press on each of the buttons to execute a predefined process. When the second controller detects a specific operation different from a normal operation on at least one button among the buttons while electric power is supplied to the driving system and the second controller is operated in a normal operation mode, the second controller prohibits the power from being turned off.

20 Claims, 8 Drawing Sheets

(51) Int. Cl.
  *B62M 6/40* (2010.01)
  *B62M 6/90* (2010.01)
  *B62M 6/80* (2010.01)

(56) References Cited

U.S. PATENT DOCUMENTS

| | | |
|---|---|---|
| 2015/0367750 A1 | 12/2015 | Takamoto et al. |
| 2017/0029057 A1* | 2/2017 | Kato .................. B62M 6/55 |
| 2018/0072377 A1* | 3/2018 | Kishita ................ B62J 6/00 |
| 2019/0009859 A1* | 1/2019 | Komatsu .............. B62K 25/04 |
| 2019/0031283 A1* | 1/2019 | Suzuki ................ G08C 17/02 |
| 2019/0047659 A1* | 2/2019 | Usami ................. B62M 6/50 |

FOREIGN PATENT DOCUMENTS

| | | |
|---|---|---|
| JP | 2003-185152 A | 7/2003 |
| JP | 2007-329810 A | 12/2007 |
| JP | 2010-155523 A | 7/2010 |
| WO | 2017/009637 A1 | 1/2017 |

* cited by examiner

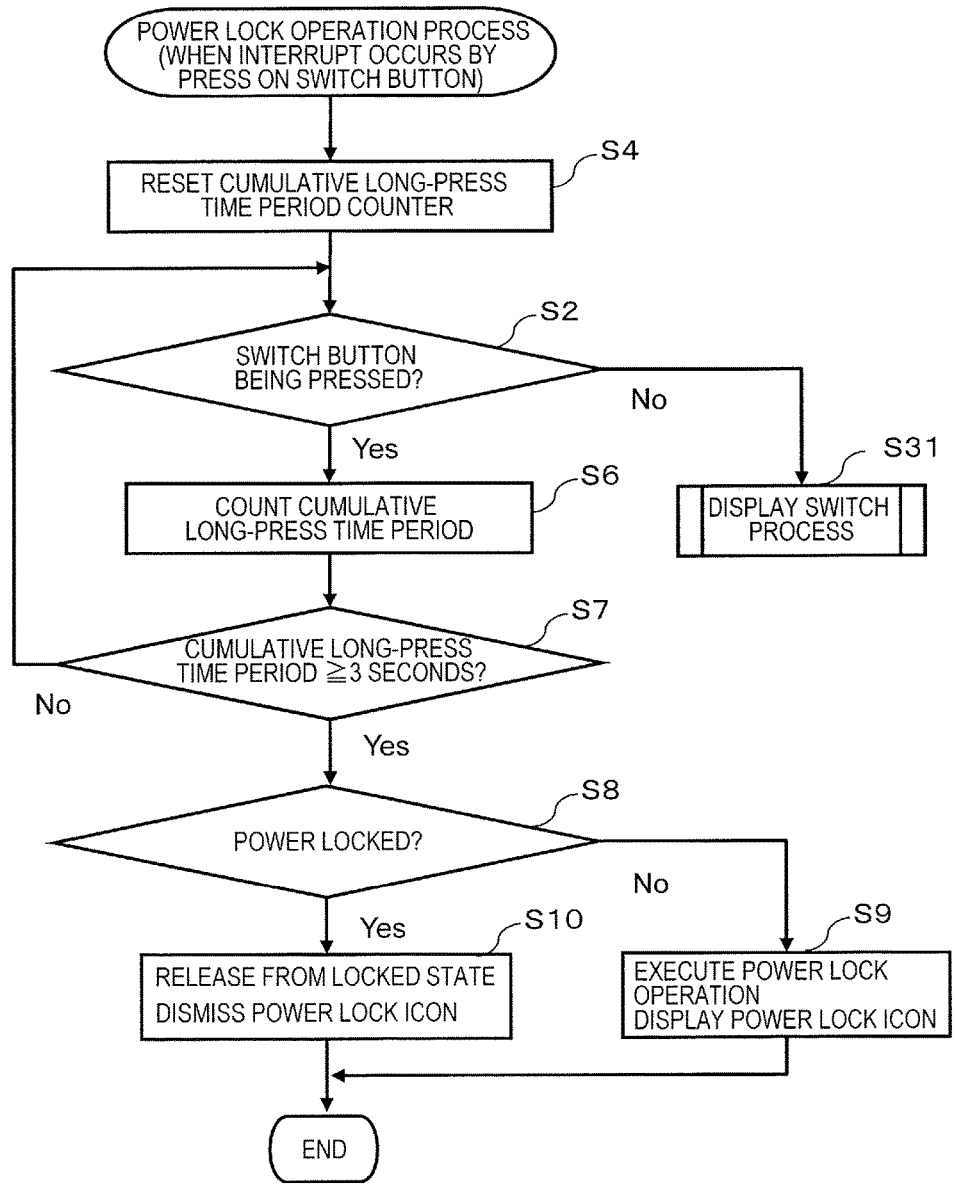

ELECTRICALLY POWER ASSISTED BICYCLE

CROSS REFERENCE TO RELATED APPLICATIONS

This application claims the benefit of priority to Japanese Patent Application No. 2016-180401 filed on Sep. 15, 2016. The entire contents of this application are hereby incorporated herein by reference.

BACKGROUND OF THE INVENTION

1. Field of the Invention

The present invention relates to an electrically power assisted vehicle, and more specifically, to power control of an electrically power assisted bicycle performed by an operation panel provided on the electrically power assisted bicycle.

2. Description of the Related Art

An electrically power assisted bicycle generates an assist force to assist the human power of a driver (rider) by use of an electric motor. The magnitude of the assist force varies in accordance with the magnitude of the force applied by the rider to a pedal. The assist force alleviates the load on the rider while the bicycle is running on a slope or the like. The assist force also allows the vehicle speed to be easily maintained at a certain level or higher, which is required to keep the running stability of the electrically power assisted bicycle.

A steering handle of an electrically power assisted bicycle is generally provided with an operation panel. The operation panel includes a plurality of buttons. The plurality of buttons include, for example, a power button that turns on or off the power of the electrically power assisted bicycle, and an assist force setting button that sets the assist force provided by an electric motor or to set the running mode that corresponds to the magnitude of the assist force. One type of operation panel includes a display panel or the like that displays the vehicle speed, the remaining capacity of a battery, or the like. The rider may view the information displayed on the display panel to make a necessary operation in the vicinity of his/her hand. Japanese Laid-Open Patent Publication No. 2010-155523 discloses an electrically power assisted bicycle including an operation panel. The operation panel of Japanese Laid-Open Patent Publication No. 2010-155523 includes a power switch, a mode switch, a light switch, an LED for displaying a lock/unlock state, a display change switch and the like.

Today, electrically power assisted child-care bicycles that conform to the law are available. Many electrically power assisted child-care bicycles include a child seat provided at each of a steering handle and a rear carrier, and now play an important role, like automobiles, as a short-distance transportation measure for an outing with a child.

In the case where an operation panel and a child seat are located close to each other as in an electrically power assisted child-care bicycle, a power button in the operation panel may be in an area reachable by a child. In this case, while the bicycle is running with a child present, the power may be turned off by, for example, a mischievous conduct of the child against the intention of the rider.

SUMMARY OF THE INVENTION

Preferred embodiments of the present invention solve the problem described above and limit the operation of the power such that the power of the electrically power assisted bicycle is not turned off when not expected by the rider.

An electrically power assisted bicycle in an illustrative preferred embodiment of the present invention includes a driving system including an electric motor that generates an assist force to assist human power of a rider and a first controller configured or programmed to control an operation of the electric motor; and an operation panel including a plurality of buttons and a second controller. The plurality of buttons include a power button that turns on or off a power of the driving system, and an assist force setting button that sets an assist force of the electric motor; the second controller detects a pressing of each of the plurality of buttons to execute a predefined process; and when the second controller detects a specific operation different from a normal operation, in which a button is pressed for less than a predetermined time period, on at least one button among the plurality of buttons while electric power is supplied to the driving system and the second controller is operated in a normal operation mode, the second controller prohibits the power from being turned off.

According to the above, the situation where the power is turned off against the intention of the rider by, for example, a mischievous conduct of a child is avoided. If the power is turned off inadvertently, the assist force of the electric motor is eliminated and thus the vehicle speed is decreased. According to the above-described illustrative preferred embodiment of the present invention, the power is prevented from being turned off against the intention of the rider. Therefore, the assist force provided by the electric motor is maintained. The rider is allowed to keep on riding the electrically power assisted bicycle while stepping on the pedal lightly and maintaining the vehicle speed at a certain level or higher.

In a preferred embodiment of the present invention, the second controller is configured or programmed to operate in one of the normal operation mode and a power lock mode; in the normal operation mode, each time the power button is pressed, the power is turned on and off alternately; in the power lock mode, the power is prohibited from being turned off when the normal operation is made on the power button; and when detecting the specific operation on the at least one button in the normal operation mode, the second controller changes from the normal operation mode to the power lock mode.

In a preferred embodiment of the present invention, when detecting, as the specific operation, an operation of pressing the at least one button for a predetermined time period or longer, the second controller changes from the normal operation mode to the power lock mode.

In a preferred embodiment of the present invention, the control panel further includes a display device that displays information on a running state of the electrically power assisted bicycle and includes a switch button that displays the information on the running state in a switchable manner; and when detecting, as the specific operation, an operation of pressing the switch button for a predetermined time period or longer, the second controller changes from the normal operation mode to the power lock mode.

For the specific operation made to change from the normal operation mode to the power lock mode, a switch button that displays the information on the running state in a switchable manner is preferably provided. Thus, a button for the specific operation does not need to be provided separately. Therefore, the number of buttons in the operation panel is decreased.

In a preferred embodiment of the present invention, the display device includes one of a liquid crystal panel, an organic EL panel and an electric paper panel.

In a preferred embodiment of the present invention, the at least one button is the power button; and when detecting, as the specific operation, an operation of pressing the power button for a predetermined time period or longer, the second controller changes from the normal operation mode to the power lock mode.

In a preferred embodiment of the present invention, when detecting, as the specific operation, an operation of pressing two predefined buttons at the same time, the second controller changes from the normal operation mode to the power lock mode.

In a preferred embodiment of the present invention, one of the two predefined buttons is the power button.

In a preferred embodiment of the present invention, in the power lock mode, when the normal operation is made on the power button, the second controller prohibits the power from being turned off, and when a normal operation is made on the assist force setting button, the second controller accepts the normal operation.

For the specific operation made to change from the normal operation mode to the power lock mode, the power button or existing two buttons are preferably used. Thus, a button for the specific operation does not need to be provided separately. When a normal operation is made on the assist force setting button, which is an existing button, the normal operation is accepted. Therefore, the number of buttons in the operation panel is decreased.

In a preferred embodiment of the present invention, when the operation made on the assist force setting button is an operation to make the assist force of the electric motor zero, the second controller prohibits the operation from being accepted.

Since the operation to make the assist force zero is prohibited from being accepted, the rider keeps on riding with the assist force.

In a preferred embodiment of the present invention, the electrically power assisted bicycle further includes a headlight. The operation panel includes a light button that switches on or off the headlight; when the headlight is off in the power lock mode, the second controller switches on the headlight in response to the normal operation on the light button; and when the headlight is on in the power lock mode and the normal operation is made on the light button, the second controller keeps the headlight on.

Even in the power lock mode, the rider is allowed to light up the headlight without cancelling the power lock mode, which improves the convenience. In the power lock mode, the second controller prohibits the headlight from being switched off. Even when the headlight button is pressed by, for example, a mischievous conduct of a child while the headlight is on, the headlight is kept lit on. Therefore, the rider keeps on riding with a sufficient level of brightness.

In a preferred embodiment of the present invention, the operation panel further includes a display device that displays information on a running state of the electrically power assisted bicycle; and when the normal operation mode is changed to the power lock mode, the second controller displays, on the display device, an image showing that the electrically power assisted bicycle is in the power lock mode.

Even in the case where the rider forgets that the current operation mode is the power lock mode, the rider may visually check the image and thus recognize that the current operation mode is the power lock mode. Thus, the rider easily understands that the operation to turn off the power is invalid. Therefore, the rider is not concerned why the power is not turned off or does not misunderstand that a malfunction has occurred.

In a preferred embodiment of the present invention, when the normal operation is made on the power button in the power lock mode, the second controller changes a display manner of the image on the display device.

In a preferred embodiment of the present invention, the second controller blinks the image.

In a preferred embodiment of the present invention, when the normal operation is made on the power button in the power lock mode, the second controller blinks a portion of, or the entirety of, a display area of the display device.

In a preferred embodiment of the present invention, the electrically power assisted bicycle further includes a lamp that blinks in the power lock mode. When the normal operation is made on the power button in the power lock mode, the second controller blinks the lamp.

Thus, the vision of the rider is stimulated, so that the rider visually recognizes the image more easily and understands that the current operation mode is the power lock mode.

In a preferred embodiment of the present invention, the electrically power assisted bicycle further includes a speaker that outputs an audio signal. When the normal operation is made on the power button in the power lock mode, the second controller outputs an audio signal from the speaker.

The rider visually recognizes the image or the blinking of the lamp and also hears the sound from the speaker, so as to recognize that the current operation mode is the power lock mode more certainly. Even if the rider does not see the image or the blinking of the lamp, the rider recognizes that the current operation mode is the power lock mode with only the sound.

In a preferred embodiment of the present invention, when an electric circuit in the operation panel is detected to be turned on by pressing on the at least one button and is detected to be turned off by releasing the at least one button, the second controller in the operation panel accepts the specific operation.

When the electric circuit in the operation panel is detected to be on and is also detected to be off, the specific operation made on at least one button to prohibit the power from being turned off is accepted. Therefore, in the case where the at least one button is jammed or in a stuck state while being pressed, the specific operation to prohibit the power from being turned off is not accepted. Thus, the power is avoided from being locked against the intention of the rider.

An electrically power assisted bicycle in another illustrative preferred embodiment of the present invention includes a driving system including an electric motor that generates an assist force that assists human power of a rider and includes a first controller configured or programmed to control an operation of the electric motor; and an operation panel including a plurality of buttons and a second controller. The plurality of buttons include a power button that turns on or off a power of the driving system, and an assist force setting button that sets an assist force of the electric motor; the second controller is configured or programmed to detects a press on each of the plurality of buttons to execute a predefined process; and the second controller turns off the power when detecting a specific operation different from a normal operation on at least one button among the plurality of buttons while electric power is supplied to the driving system.

In a preferred embodiment of the present invention, when detecting an operation of keeping pressing the power button for a predetermined time period or longer, the second controller turns off the power.

When wishing to turn off the power, the rider may press the at least one button for the predetermined time period or longer (a long press). Since the power is not turned off by a short press, it is not necessary to distinguish the normal operation mode and the power lock mode. This simplifies the operation of the rider, and confusion of the rider regarding the operation is alleviated.

With an electrically power assisted vehicle or bicycle according to the illustrative preferred embodiment described above, when the second controller in the operation panel detects a specific operation different from a normal operation on at least one button among the plurality of buttons while electric power is supplied to the driving system of the vehicle or bicycle and the second controller is operated in a normal operation mode, the second controller prohibits the power from being turned off. This prevents the power from being turned off inadvertently for the rider. Since the assist force of the electric motor is maintained, the rider is allowed to keep on riding the electrically power assisted bicycle while stepping on the pedal lightly and maintaining the vehicle speed at a certain level or higher.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a flowchart showing a modification of the process on the power lock operation.

DETAILED DESCRIPTION OF THE PREFERRED EMBODIMENTS

Hereinafter, an electrically power assisted bicycle according to preferred embodiments of the present invention will be described with reference to the drawings. In the following preferred embodiments, like components will have like reference signs, and the same descriptions will not be repeated. In the preferred embodiments of the present invention, the terms "front", "rear", "left", "right", "up" and "down" respectively refer to front, rear, left, right, up and down in a state where a rider of an electrically power assisted bicycle sits on a saddle (seat) thereof while facing a handle thereof. The following preferred embodiments are illustrative and do not limit the present invention in any way.

In the following description, an electrically power assisted bicycle that allows a child to ride thereon will be described as an example. In the following description, the term "rider" does not refer to the child who is on the electrically power assisted bicycle, but refers to a person operating the bicycle. It is not required that a child is on the electrically power assisted bicycle. Preferred embodiments of the present invention are applicable to an electrically power assisted bicycle that does not include a child seat. The following preferred embodiments are illustrative, and the present invention is not limited to the following preferred embodiments.

Figure 1:
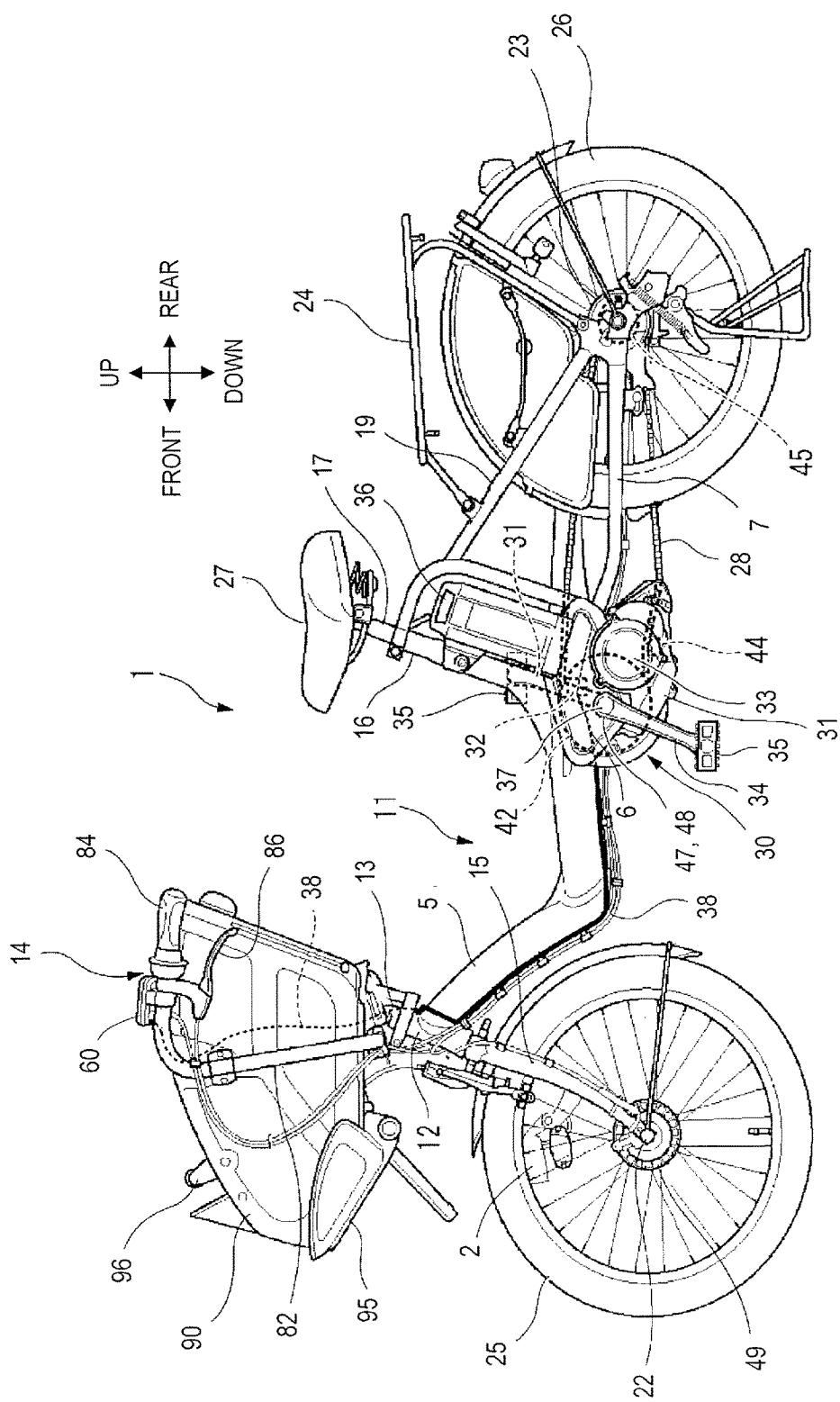
FIG. 1 is a side view of an electrically power assisted bicycle 1 according to a preferred embodiment of the present invention.

FIG. 1 is a side view of an electrically power assisted bicycle 1 according to a preferred embodiment of the present invention. FIG. 1 shows a two-wheel electrically power assisted bicycle as an example of the electrically power assisted bicycle 1.

The electrically power assisted bicycle 1 includes a vehicle frame 11 extending in a front-rear direction. The vehicle frame 11 includes a head pipe 12, a down tube 5, a bracket 6, a chain stay 7, a seat tube 16, and a seat stay 19. The head pipe 12 is located at a front end of the vehicle frame 11. The handle stem 13 is rotatably inserted into the head pipe 12. A handle 14 is secured to a top portion of the handle stem 13. A front fork 15 is secured to a bottom portion of the handle stem 13. At a bottom end of the front fork 15, a front wheel 25, which is a steered wheel, is rotatably supported via an axle 22. At the bottom end of the front fork 15, a front wheel rotation sensor 49 that detects the rotation of the front wheel 25 is provided. To the side of the front wheel 25, a headlight 2 is located. The headlight 2 is attached to the front fork 15.

The handle 14 is provided with a child seat 90 such that the child seat 90 is pivotable together with the handle 14. When the rider pivots the handle 14 to operate the handle 14, the child seat 90 is pivoted together with the handle 14.

The down tube 5 extends obliquely downward and rearward from the head pipe 12. The seat tube 16 extends upward from a rear end of the down tube 16. The chain stay 7 extends rearward from a bottom end of the seat tube 16. The bracket 6 connects a rear end of the down tube 5, the bottom end of the seat tube 16 and a front end of the chain stay 7 to each other.

A seat post 17 is inserted into the seat tube 16. A saddle 27, on which the rider sits, is provided at a top end of the seat post 17. A rear end of the chain stay 7 rotatably supports a rear wheel 26, which is a driving wheel. The seat stay 19 extends obliquely rearward and downward from a top portion of the seat tube 16. A bottom end of the seat stay 19 is connected with a rear portion of the chain stay 7. The seat stay 19 supports a rack 24 located to the rear of the saddle 27.

A drive unit 30 is attached to the bracket 6 located at, or in the vicinity of, a vehicle center of the vehicle frame 11. The drive unit 30 includes a control device 32, an electric motor 33, crank arms 34, pedals 35, a crankshaft 37, a drive sprocket 42, an assist sprocket 44, a torque sensor 47, and a crank sensor 48. These components included in the drive unit 30 are incorporated into a unit case 31. A driven sprocket 45 is provided coaxially with a driving shaft 23 of the rear wheel 26. A battery 36 that supplies electric power to the electric motor 33 and the like is mounted on the bracket 6. The battery 36 may be supported by the seat tube 16.

The crankshaft 37 is supported by extending through the drive unit 30 in a left-right direction. At both of two ends of the crankshaft 37, the crank arms 34 are provided. At a tip of each of the crank arms 34, a pedal 35 is rotatably provided. Human power (pressing force) applied by the rider to the pedals 35 is detected by the torque sensor 47 as a torque generated in the crankshaft 37. The crank sensor 48 detects the rotation of the crankshaft 37.

The control device 32 controls various operations of the electrically power assisted bicycle 1. A rotation output of the crankshaft 37 generated when the rider presses and rotates the pedals 35 is transmitted to the rear wheel 26 via the drive sprocket 42, a chain 28 and the driven sprocket 45. The control device 32 controls the electric motor 33 such that the electric motor 33 generates a driving assist output in accordance with the rotation output of the crankshaft 37. The driving assist output from the electric motor 33 is transmitted to the rear wheel 26 via the assist sprocket 44, the chain 28 and the driven sprocket 45. Instead of the chain 28, a belt, a shaft or the like may be used. With the electrically power assisted bicycle 1, the electric motor 33 generates an assist power that assists the human power of the rider, so that the load on the rider is decreased when, for example, the electrically power assisted bicycle 1 is running on a slope or carrying a load.

The handle 14 is provided with an operation panel 60. The rider operates the operation panel 60 to switch on or off the electrically power assisted bicycle 1 or sets the magnitude of the assist power of the electric motor 33. The operation panel 60 transmits or receives information to or from the control device 32 via a line 38.

Figure 2:
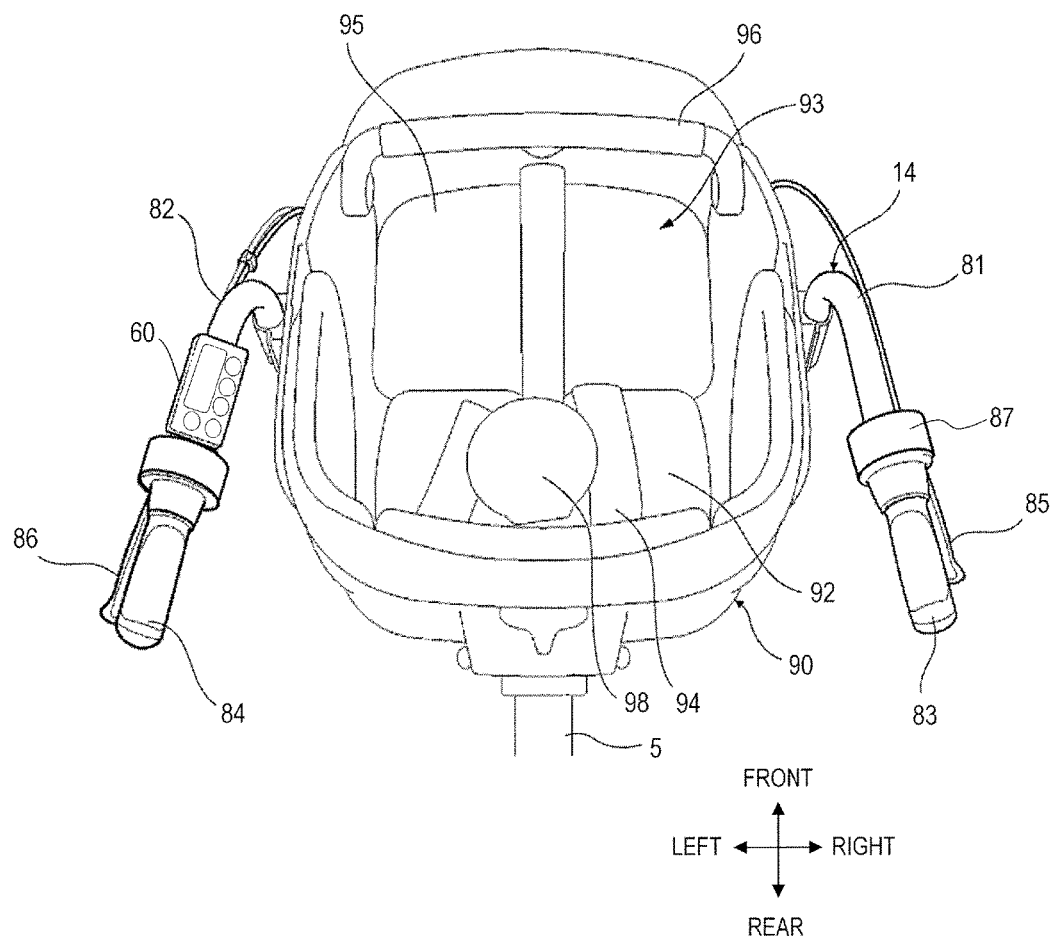
FIG. 2 is a top view of showing a front portion of the electrically power assisted bicycle 1.

FIG. 2 is an isometric view showing a front portion of the electrically power assisted bicycle 1. The handle 14 includes a right handle bar 81 and a left handle bar 82. At a rear end of the right handle bar 81, a right grip 83 is provided. At a rear end of the left handle bar 82, a left grip 84 is provided. The rider steers the electrically power assisted bicycle 1 while gripping the right grip 83 and the left grip 84.

A front wheel brake lever 85 is provided in the vicinity of the right grip 83. A rear wheel brake lever 86 is provided in the vicinity of the left grip 84. When the rider grips the right grip 83 and also the front wheel brake lever 85 with his/her right hand, a braking force is provided to the front wheel 25. When the rider grips the left grip 84 and also the rear wheel brake lever 86 with his/her left hand, a braking force is provided to the rear wheel 26.

A gear shifter 87 usable by the rider to switch the gear ratio is provided in the vicinity of the right grip 83 provided on the right handle bar 81. The operation panel 60 is provided in the vicinity of the left grip 84 provided at the left handle bar 82.

The handle 14 supports the child seat 90, in which a child may sit. The child seat 90 is located between the right handle bar 81 and the left handle bar 82. The child seat 90 has a concaved shape with a top opening. The child seat 90 includes a sitting portion 92, at a bottom surface thereof, on which a child may be sit. The child seat 90 includes a through-hole 93, allowing the legs of a child to be inserted, to the front of the sitting portion 92. Below the through-hole 93, a footrest 95 is provided. The child seat 90 includes a seat belt 94 that holds the body of the child while the child is sitting. The seat belt 94 includes a buckle 98 that fastens or loosens the seat belt 94. A bar 96 that is able to be gripped by a child is provided at a position forward and upward with respect to the sitting portion 92.

Figure 3:
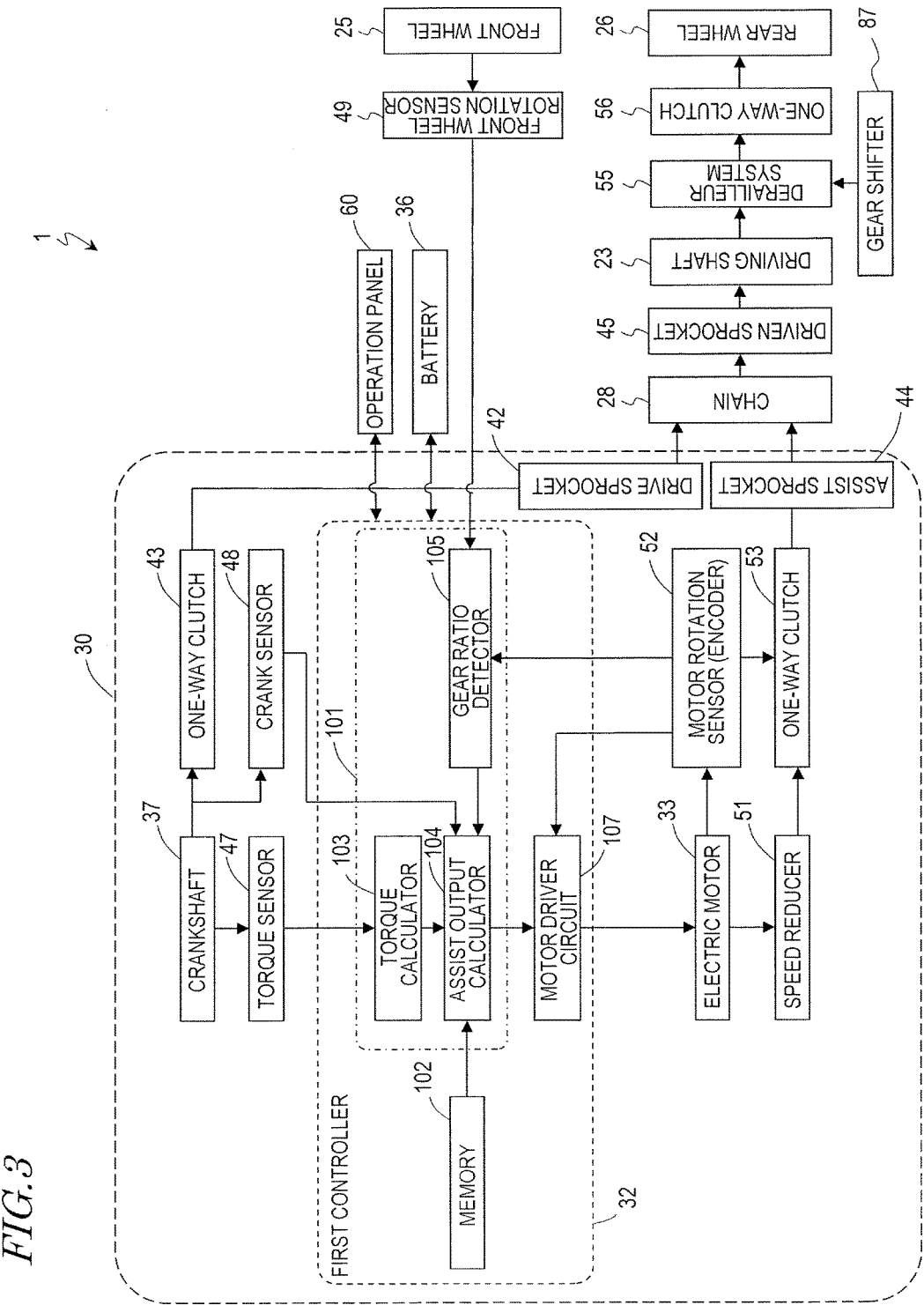
FIG. 3 is a block diagram showing a mechanical and electrical structure of the electrically power assisted bicycle 1.

FIG. 3 is a block diagram showing a mechanical and electric structure of the electrically power assisted bicycle 1. The drive unit 30 includes the crankshaft 37, the torque sensor 47, a one-way clutch 43, the crank sensor 48, the drive sprocket 42, the control device 32, the electric motor 33, a motor rotation sensor 52, a speed reducer 51, a one-way clutch 53, and the assist sprocket 44. The drive unit 30 is an assist output control system that causes the electric motor 33 to generate a driving assist output in accordance with human power of the rider applied to the pedals 35.

First, a transmission route of mechanical power will be described. When the rider presses the pedals 35 to rotate the crankshaft 37, the rotation of the crankshaft 37 is transmitted to the chain 28 via the one-way clutch 43 and the drive sprocket 42. The one-way clutch 43 transmits only a forward rotation of the crankshaft 37 to the drive sprocket 42, but does not transmit a reverse rotation of the crankshaft 37 to the drive sprocket 42. The rotation of the electric motor 33 is transmitted to the chain 28 via the speed reducer 51, the one-way clutch 51 and the assist sprocket 44. The one-way clutch 51 transmits, to the assist sprocket 44, only a rotation of the electric motor 33 in such a direction as to rotate the chain 28 in a forward direction, but does not transmit to the assist sprocket 44 a rotation of the electric motor 33 in such a direction as to rotate the chain 28 in a reverse direction. The crank rotation output generated by the human power applied by the rider to the pedals 35 and the driving assist output generated by the electric motor 33 are combined by the chain 28.

The rotation of the chain 28 is transmitted to the driving shaft 23 via the driven sprocket 45. The rotation of the driving shaft 28 is transmitted to the rear wheel 26 via a derailleur system 55 and a one-way clutch 56.

The derailleur system 55 changes the gear ratio in accordance with the input operation made by the rider on the gear shifter 87. The one-way clutch 56 transmits the rotation of the driving shaft 23 to the rear wheel 26 only when the rotation rate of the driving shaft 23 is higher than the rotation rate of the rear wheel 26. When the rotation rate of the driving shaft 23 is lower than the rotation rate of the rear wheel 26, the one-way clutch 56 does not transmit the rotation of the driving shaft 23 to the rear wheel 26.

Another type of the electrically power assisted bicycle is also known, in which the crank rotation output generated by the human power applied by the rider to the pedals 35 and the driving assist output generated by the electric motor 33 are combined at the crankshaft 37. Each type of the electrically power assisted bicycle is one of a plurality of preferred embodiments according to the present invention.

Now, driving control performed by the control device 32 on the electric motor 33 will be described. The control device 32 is, for example, an MCU (Motor Controller). Thus, the control device 32 is also referred to as a "first controller". The control device 32 includes a microcontroller 101, a memory 102, and a motor driver circuit 107. The microcontroller 101 controls the operation of the electric motor 33 and also controls the operation of the components of the electrically power assisted bicycle 1. The memory 102 has stored therein, for example, a computer program that defines a procedure that controls the electric motor 33 and the components of the electrically power assisted bicycle 1. The microcontroller 101 reads the computer program from the memory 102 to execute various controls. The area enclosed by the one-dot chain line in FIG. 3 shows a functional block of the microcontroller 101. The microcontroller 101 is configured or programmed to function as a torque calculator 103, an assist output calculator 104, and a gear ratio detector 105.

The human power (pressing power) applied by the rider on the pedals 35 is detected by the torque sensor 47 as a torque generated in the crankshaft 37. The torque sensor 47 outputs a voltage signal in accordance with the detected torque to the torque calculator 103. The torque calculator 103 converts the voltage signal from the torque sensor 47 into a torque. For example, the torque calculator 103 converts an analog voltage signal input from the torque sensor 47 into a digital voltage signal, and calculates the torque based on the level of the digital voltage signal. The torque calculator 103 outputs the calculated torque to the assist output calculator 104.

The crank sensor 48 detects a rotation angle of the crankshaft 37. The crank sensor 48 outputs a signal in accordance with the rotation angle of the crankshaft 37 to the assist output calculator 104. For example, the crank sensor 48 detects the rotation of the crankshaft 37 at an interval of a predetermined angle and outputs a square wave signal or a sine wave signal. The assist output calculator 104 calculates a rotation rate of the crankshaft 37 based on the output signal from the crank sensor 48. The assist output calculator 104 multiples the rotation rate of the crankshaft 37 by the torque calculated by the torque calculator 103 to calculate a crank rotation output.

The electric motor 33 is provided with the motor rotation sensor 52. The motor rotation sensor 52 is, for example, an encoder.

The motor rotation sensor 52 detects a rotation angle of a rotor of the electric motor 33 and outputs a signal in accordance with the rotation angle to the gear ratio detector 105 and the motor driver circuit 107. For example, the motor rotation sensor 52 detects the rotation of the rotor at an interval of a predetermined angle and outputs a square wave signal or a sine wave signal. The gear ratio detector 105 and the motor driver circuit 107 calculate a rotation rate of the electric motor 33 based on the output signal from the motor rotation sensor 52.

The front wheel rotation sensor 49 detects a rotation angle of the front wheel 25 and outputs a signal in accordance with the rotation angle to the gear ratio detector 105. For example, the front wheel rotation sensor 49 detects the rotation of the front wheel 25 at an interval of a predetermined angle and outputs a square wave signal or a sine wave signal. The gear ratio detector 105 calculates a rotation rate of the front wheel 25 based on the output signal from the front wheel rotation sensor 49. The gear ratio detector 105 calculates a gear ratio based on the rotation rate of the electric motor 33 and the rotation rate of the front wheel 25, and outputs the calculated gear ratio to the assist output calculator 104.

The assist output calculator 104 calculates a command value to cause the electric motor 33 to generate an appropriate driving assist output based on the outputs from the torque calculator 103, the crank sensor 48 and the gear ratio detector 105, a button operation made by the rider on the operation panel 60, information stored in the memory 102, or the like. Then, the assist output calculator 104 outputs the command value to the motor driver circuit 107. The assist output calculator 104, for example, refers to a map created based on, for example, the relationship between the crank rotation output generated by the human power of the rider applied to the pedals 35 and the driving assist output generated by the electric motor 33 to calculate the command value. In the memory 102, a plurality of types of maps are stored. The assist output calculator 104 reads a map suitable corresponding to certain conditions from the memory 102 and refers to the map to calculate the command value.

The motor driver circuit 107 is, for example, an inverter, and supplies electric power in accordance with the command value from the assist output calculator 104 to the electric motor 33 from the battery 36. When supplied with the electric power, the electric motor 33 is rotated to generate a predetermined driving assist output. In this manner, the assist output calculator 104 allows the electric motor 33 to generate a driving assist output so as to assist the motion of the rider pressing the pedals 35 while the electrically power assisted bicycle 1 is running.

Now, the operation panel 60 will be described in detail.

Figure 4:
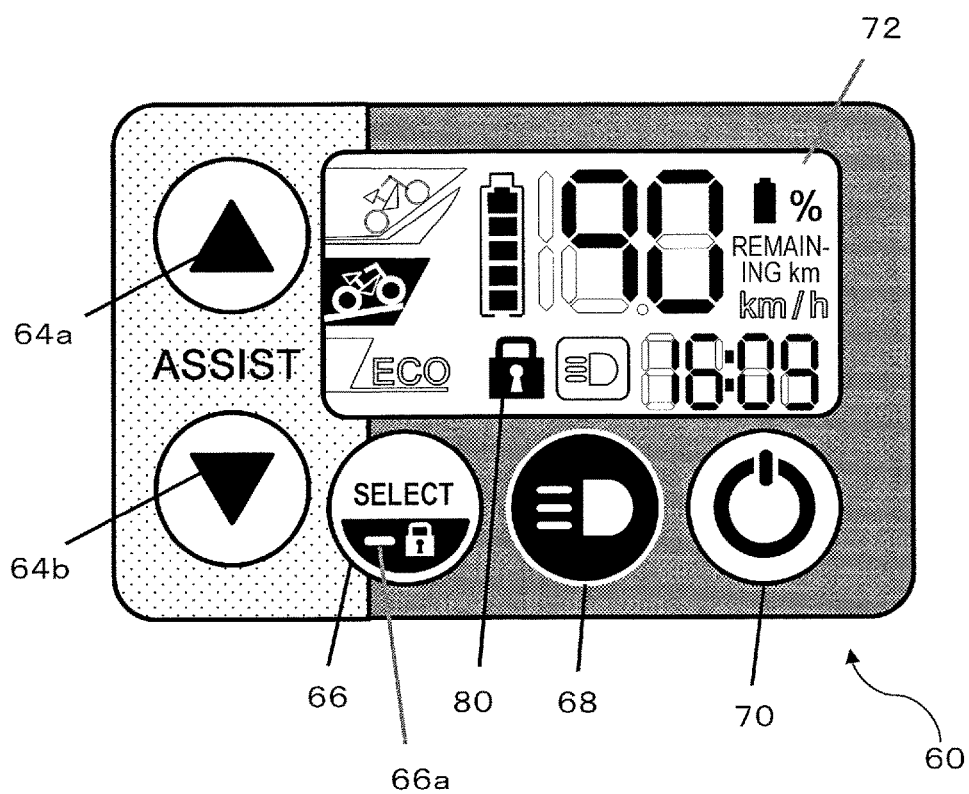
FIG. 4 is an external view of an operation panel 60.

FIG. 4 is an external view of the operation panel 60. The operation panel 60 includes a plurality of buttons 64a, 64b, 66, 68 and 70 and a liquid crystal panel 72. The plurality of buttons include, specifically, assist force setting buttons 64a and 64b, a switch button 66, a headlight button 68, and a power button 70, for example.

The assist force setting buttons 64a and 64b set an assist force of the electric motor 33 or a running mode corresponding to the magnitude of the assist force. The "assist force" of the electric motor 33 is a force that assists human power. In this example, four running modes are provided for the electrically power assisted bicycle 1. The four running modes are, for example, an assist-free mode, an ecological mode, a standard mode and a strong mode, in the order from the mode in which the magnitude of assistance to human power is weakest. In the assist-free mode, the electric motor 33 does not generate any assist force.

When the rider presses the assist force setting button 64a in the assist-free mode, the assist-free mode is changed to the ecological mode. When the rider presses the assist force setting button 64a in the ecological mode, the ecological mode is changed to the standard mode. When the rider presses the assist force setting button 64a in the standard mode, the standard mode is changed to the strong mode. Even if the rider presses the assist force setting button 64a in the strong mode, the strong mode is maintained and is not changed. By contrast, when the assist force setting button 64b is pressed in this state, the strong mode is changed to the standard mode as described below.

The assist force setting button 64b is pressed to select a running mode that provides a weaker assist force, opposite to the assist force setting button 64a. When the rider presses the assist force setting button 64b in the strong mode, the strong mode is changed to the standard mode. When the rider presses the assist force setting button 64b in the standard mode, the standard mode is changed to the ecological mode. When the rider presses the assist force setting button 64b in the ecological mode, the ecological mode is changed to the assist-free mode. Even if the rider presses the assist force setting button 64b in the assist-free mode, the assist-free mode is maintained and is not changed. When the rider presses the assist force setting button 64a in this state, the assist-free mode is changed to the ecological mode.

In the example shown in FIG. 4, a running mode display area is provided in a left portion of the liquid crystal panel 72. In the example shown in FIG. 4, the standard mode at the center is highlighted to show that the standard mode is now selected.

The switch button 66 is used by the rider to switch the display on the liquid crystal panel 72. In the present preferred embodiment, the liquid crystal panel 72 is able to display the remaining capacity of the battery 36, the remaining distance by which assisted running is possible, and the current running speed. Each time the rider presses the switch button 66, the display on the liquid crystal panel 72 is sequentially switched to the remaining capacity of the battery 36, to the remaining distance by which assisted running is possible, and to the current running speed. In the example shown in FIG. 4, such information is displayed in an upper right portion of the liquid crystal panel 72. In FIG. 4, the remaining capacity of the battery 36 is displayed as "90%", for example. The other items, specifically, "remaining km" and "km/h", respectively represent the remaining distance by which assisted running is possible and the current running speed.

The headlight button 68 is used to alternately switch on or off the headlight 2.

The power button 70 turns on or off the driving system of the electrically power assisted bicycle 1. The driving system at least includes the electric motor 33 and the control device 32 or the first controller.

In the present preferred embodiment, the liquid crystal panel 72 displays letters, symbols, icons and the like using a segment system. This is merely illustrative. The liquid crystal panel 72 may display letters, symbols, icons and the like in a display area using a dot matrix system, or display a moving image. The liquid crystal panel 72 is merely an example. Instead of the display device, an organic EL, or electronic paper display panel or the like may be used.

Figure 5:
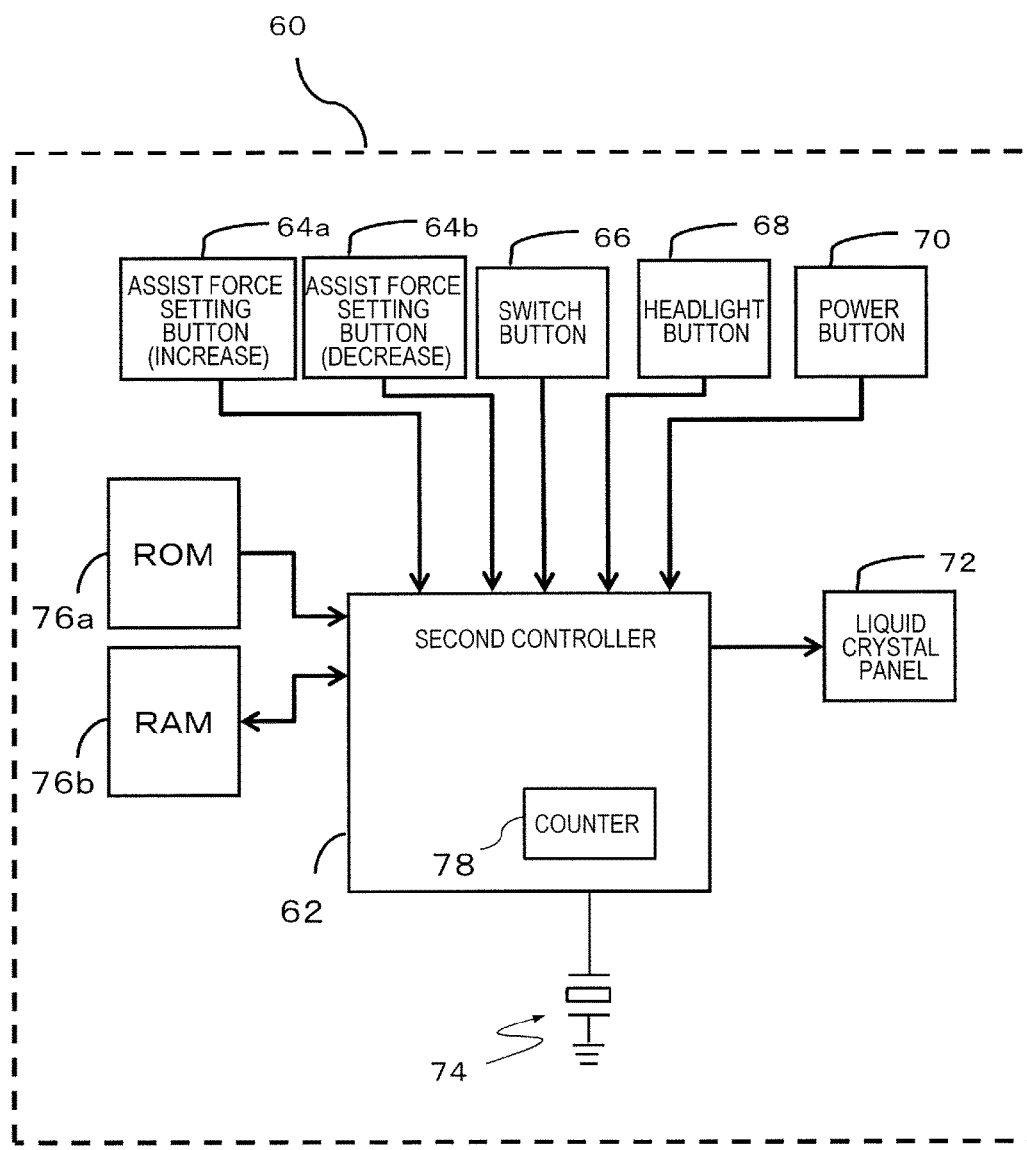
FIG. 5 shows a hardware structure of the operation panel 60.

FIG. 5 shows a hardware structure of the operation panel 60. In addition to the buttons and the like shown in FIG. 4, the operation panel 60 includes a second controller 62, an oscillator 74 made of quartz or silicon or the like, a ROM 76a, and a RAM 76b.

The second controller 62 is preferably a semiconductor integrated circuit, for example, that controls the operation of the operation panel 60. The second controller 62 is connected with the plurality of -buttons 64a, 64b, 66, 68 and 70 to detect whether the respective buttons have been pressed. The buttons may be pressed in the manner of a "short press" and a "long press". The second controller 62 detects a "short press" and a "long press". For example, when the rider starts pressing a button, the second controller 62 detects a voltage value and/or a current value of a predetermined level or higher. When the rider finishes pressing the button, the second controller 62 detects that the voltage value and/or the current value that has been detected is now, for example, zero. The second controller 62 determines whether the press was a short press or a long press based on the time period from the detection of the voltage value and/or the current value until the detection of the voltage value and/or the current value becoming zero. The second controller 62 may detect a short press or a long press of a plurality of buttons at the same time.

In this specification, when the time period from when the rider starts pressing a button with his/her finger until releasing the finger from the button is shorter than 3 seconds, for example, the second controller 62 determines that the press is a "short press". By contrast, when the time period from when the rider starts pressing a button with his/her finger until releasing the finger from the button is 3 seconds or longer, the second controller 62 determines that the press is a "long press".

In order to determine whether a press is a short press or a long press, the second controller 62 uses a counter 78. While a button is pressed, the second controller 62 counts up or counts down the value of the counter 78 by use of a clock signal supplied from the oscillator 74 or a frequency-divided signal obtained as a result of the frequency of the clock signal being divided. While, for example, being counted up, the count value is added in a cumulative manner in the counter 78. The count value directly corresponds to the time period in which the button is pressed (e.g., 1 second). The second controller 62 converts the count value into the length of the actual time period and executes the following process. When, for example, the frequency of the signal used to count up the value is f (Hz) and the count value accumulated in the counter 78 is C, the actual time period is expressed as C/f (sec.). The following description will be made with the length of the actual time period (unit: second) and the conversion computation will not be described in order to avoid a complicated explanation.

In this specification, a "short press" may be referred to as a "normal operation". A reason for this is that an operation such as a short press is a usual operation that is made by a general rider with no specific attention as to, for example, how long the button is being pressed. For example, during normal running, the rider may press the assist force setting button 64a or 64b once with his/her finger and instantaneously release the finger to change the running mode. The rider may press the headlight button 68 once with his/her finger and instantaneously release the finger to switch on or off the headlight 2. The time period with which it is considered that the rider "releases his/her finger from the button instantaneously" is set as described above. Thus, when a button is pressed, the second controller 62 determines whether or not the press is a short press. Since the short press is referred to as a normal operation, the long press is considered as an "operation that is not a normal operation". Another example of the "operation that is not a normal operation" is a repeated press operation. When determining that a short press is made a plurality of times repeatedly in a predetermined time period, the second controller 62 determines that an operation different from a short press, which is a normal operation, is made (i.e., that a repeated press operation is made) and performs the same process as when a long press is made.

As described above in the "Background of the Invention" section, conventionally, when the power button 70 is short-pressed, the power of a driving system is turned on or off. Therefore, it is possible that even while the electrically power assisted bicycle 1 is running, the power is turned off by the child inadvertently pressing the power button.

The present inventor configured or programmed the second controller 62 to execute at least the process shown in the flowcharts described below and include a certain limitation such that the power button 70 would not be turned off by a normal operation. The second controller 62 reads the computer program stored on the ROM 76a and executes the program in the RAM 76b, so as to execute the process. Hereinafter, the process will be described in detail. In another example, the second controller 62 may receive the computer program via a communication device not shown.

Figure 6:
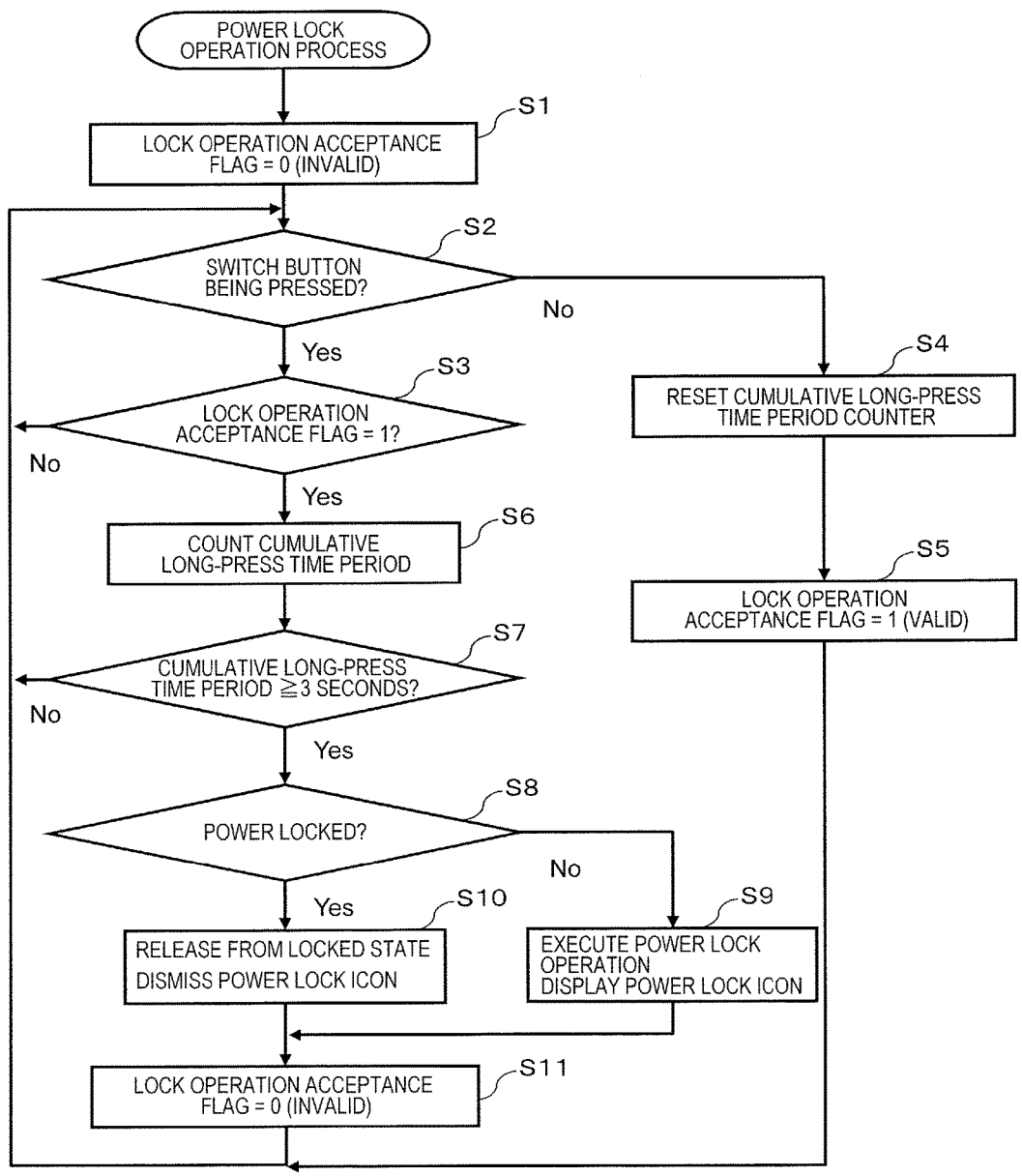
FIG. 6 is a flowchart showing a process executable by a second controller 62 on a power lock operation by use of the operation panel 60.

FIG. 6 shows a process in the present preferred embodiment that is executable by the second controller 62 on a power lock operation using the operation panel 60. The "power lock operation" is an operation made in order to put the driving system into a state where the power thereof is not turned off by a short press on the power button 70 ("locked state"), or an operation made to cancel the locked state.

In the present preferred embodiment, the second controller 62 uses a "lock operation acceptance flag" to determine whether or not to accept the power lock operation. The lock operation acceptance flag is held in, for example, a register (not shown), which is, for example, a storage area in the second controller 62. The second controller 62 rewrites the lock operation acceptance flag to 1 or 0 at a predetermined timing. In the present preferred embodiment, for example, when the lock operation acceptance flag is 1, the power lock operation is accepted, whereas when the lock operation acceptance flag is 0, the power lock operation is not accepted. For a simpler explanation, the lock operation acceptance flag will be referred to simply as the "flag", hereinafter.

In step S1, the second controller 62 sets the flag to "0".

In step S2, the second controller 62 determines whether or not the switch button 66 is being pressed. When the switch button 66 is being pressed, the process advances to step S3, whereas when the switch button 66 is not being pressed, the process advances to step S4.

Now, a state immediately after the power button 70 of the electrically power assisted bicycle 1 in a power-off state is pressed to turn on the power thereof is assumed. When the second controller 62 sets the flag to 0 in step S1, the process advances to step S4 (NO in the determination process in step S2). In step S4, the second controller 62 resets the counter 78. For example, the second controller 62 sets the value of the counter 78 to "0". Next, the second controller 62 sets the flag to 1 (step S5) and thus is put into a state where the power lock operation is acceptable. Then, the process returns to step S2. The second controller 62 executes the processes in steps S2, S4 and S5 periodically until the switch button 66 is pressed. The term "periodically" refers to, for example, once every several ten milliseconds.

In step S3, the second controller 62 determines whether or not the flag is 1. When the flag is 1, the process advances to step S6, whereas when the flag is 0, the process returns to step S2. Since step S3 is provided, the power lock operation is prohibited in the case where, for example, the switch button 62 is already pressed at the time when the power of the electrically power assisted bicycle 1 is turned on.

In step S6, the second controller 62 starts counting the cumulative long press time period. The "cumulative long press time period" refers to the time period in which the switch button 66 is kept pressed. During the cumulative long press time period, the count value of the counter 78 keeps increasing in accordance with the supply of the clock signal from the oscillator 74.

In step S7, the second controller 62 determines whether or not the cumulative long press time period is not less than 3 seconds. When the cumulative long press time period is 3 seconds or longer, the process advances to step S8, whereas when the cumulative long press time period is shorter than 3 seconds, the process returns to step S2.

In step S8, the second controller 62 determines whether or not the power lock operation is currently being made. When the power lock operation is not currently being made, the process advances to step S9, whereas when the power lock operation is currently being made, the process advances to step S10.

In step S9, the second controller 62 executes the power lock operation and displays, on the liquid crystal panel 72, a power lock icon 80 showing that the power lock operation is being made. The power lock icon 80 is shown in FIG. 4.

In step S10, the second controller 62 cancels the locked state and dismisses the power lock icon 80 from the display panel 72.

In step S11, the second controller 62 sets the flag to 0 and executes the processes in step S2 and thereafter.

As can be seen from the above, the second controller 62 is operable in a switchable manner between an operation mode when the power is locked and an operation mode when the power is not locked.

In this specification, the operation mode when the power is not locked is referred to as a "normal operation mode". In the normal operation mode, each time the power button 70 is pressed, the power is alternately turned on and off. By contrast, in this specification, the operation mode when the power is locked is referred to as a "power lock mode". In the power lock mode, the power is prohibited from being turned off when a normal operation (short press) is made on the power button 70. Namely, the power-off operation by the power button 70 is locked.

Now, a process of notifying the rider of the power lock mode will be described.

While the second controller 62 is operated in the power lock mode, the rider may forget the current operation mode. The power is not turned off by a short press on the power button 70. The rider does not understand why the power is not turned off, and may be concerned that malfunction has occurred. Notifying the rider that the current operation mode is the power lock mode at an appropriate timing is useful for the rider.

Figure 7:
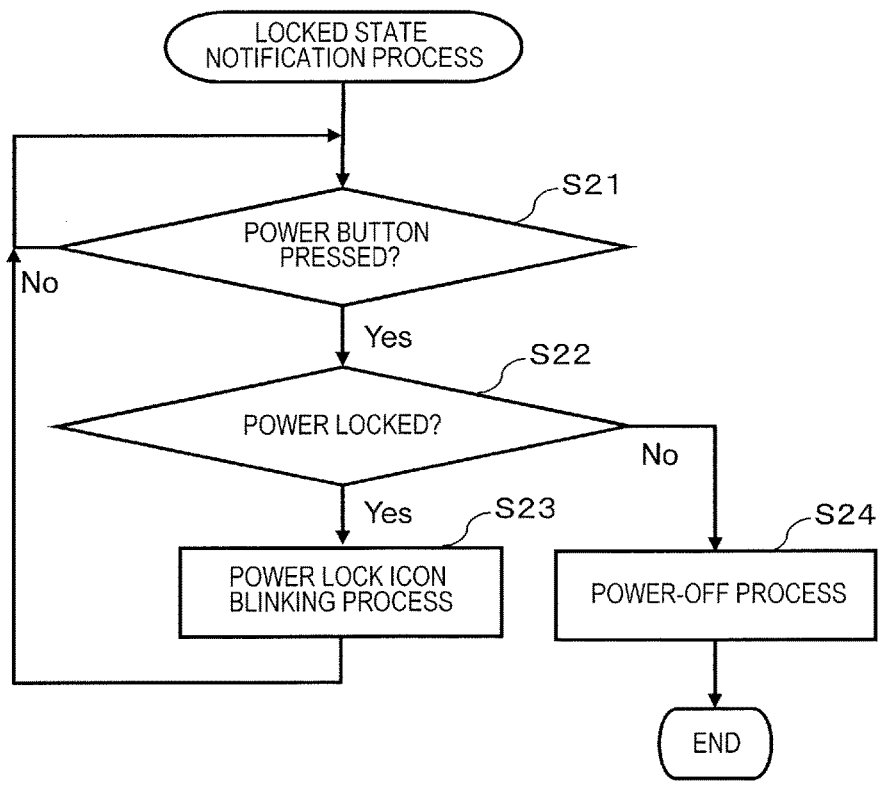
FIG. 7 is a flowchart showing a process notifying, during a power lock mode, a rider of the operation mode.

FIG. 7 shows a process of, during the power lock mode, notifying the rider that the current operation mode is the power lock mode.

In step S21, the second controller 62 determines whether or not the power button 70 is pressed. Until the power button 70 is pressed, the process in step S21 is executed repeatedly. When the power button 70 is pressed, the process advances to step S22.

In step S22, the second controller 62 determines whether or not the power is currently in a locked state. When the power is currently in the locked state, the process advances to step S23, whereas when the power is currently not in the locked state, the process advances to step S24.

In step S23, the second controller 62 executes a blinking operation on the power lock icon 80. The blinking operation executed by the second controller 62 includes, for example, specifying an area or segment in the liquid crystal panel 72 where the power lock icon 80 is to be displayed, and applying a voltage to a liquid crystal layer periodically. The power lock icon 80 is displayed at a predefined position. Therefore, the area or segment to be specified may be pre-specified at the time of production of the electrically power assisted bicycle 1. The power lock icon 80 blinks so that the rider is aware that the electrically power assisted bicycle 1 is currently in the power-locked state and is not turned off by a short press.

After the power lock icon 80 is displayed in a blinking manner, the process returns to step S21.

In step S24, the second controller 62 executes a power turning-off process. The power turning-off process includes, for example, a process of retracting the data used by the second controller 62, and a process of blocking the supply of the electric power to the driving system. When the power turning-off process is finished, the process is finished.

The power lock icon 80 blinks when the power button 70 is pressed during the power lock mode so that the rider understands that the power is currently locked and that a normal operation on the power button 70 is invalid.

In the above-described example, the power lock icon 80 blinks on the liquid crystal panel 72. This is merely an example. For example, as shown in FIG. 4, an LED indicator 66a may be provided so as to notify the rider that the power is currently locked. The LED indicator 66a is, for example, lit up when the power is locked, and may blink together with, or instead of, the power lock icon 80.

According to a method of notifying the rider more certainly, a speaker may be provided in the operation panel 60 so as to output a notification audio signal. It is more preferable to output the notification audio signal while blinking the power lock icon 80. Only the notification audio signal may be output.

Now, a modification of the process shown in FIG. 6 will be described.

According to the process shown in FIG. 6, in the case where the switch button 66 is jammed or stuck in a conductive state (kept in a contact state) due to malfunction, the execution of the power lock operation and cancellation of the power-locked state are not repeated endlessly. A reason for this is that the value of the flag is rewritten to 0 after the execution of the power lock operation or the cancellation of the power-locked state and then the value of the flag is rewritten to 1 under the condition that the switch button 66 is not pressed. After the power is turned on, the second controller 62 does not change from the operation mode to the power lock mode unless the switch button 66 is recognized to be released from the pressed state at least once. Therefore, locking of the power with no intention of the rider is prevented.

However, the process of determining whether or not the switch button 66 is in a stuck state is not required according to preferred embodiments of the present invention. Thus, hereinafter, a process not including the process of determining whether or not the switch button 66 is in a stuck state will be described.

FIG. 8 shows a modification of the process on the power lock operation. In FIG. 8, the same steps as those in FIG. 6 have the same step numbers. Except for step S31, the steps in FIG. 8 are the same as those in FIG. 6, but the order thereof is different. The process shown in FIG. 8 does not include the process on the flag. Hereinafter, each of the steps will be described briefly.

The process shown in FIG. 8 is executed as one of an interrupt process executed when the second controller 62 receives an interrupt signal showing that the switch button 66 is pressed.

First, the second controller 62 resets the counter 78 (step S4) and then determines whether or not the switch button 66 is being pressed (step S2). When the switch button 66 is pressed, the second controller 62 starts counting the cumulative long press time period (step S6). Until the cumulative long press time period becomes 3 seconds or longer, the processes in steps S2 and S6 are repeated.

When the pressing on the switch button 66 is finished before the cumulative long press time period becomes 3 seconds or longer (NO in step S2), the second controller 62 determines that the pressing on the switch button 66 is a short press and executes a display switch process (step S31). The "display switch process" is a process of switching the display to the remaining capacity of the battery, to the remaining distance by which assisted running is possible, and to the current running speed, as described above. The display switch process will not be described in detail.

When the cumulative long press time period becomes 3 seconds or longer, the second controller 62 executes the process in step S8 and the process in step S9 or S10. As a result, the power lock operation is executed or the power-locked state is cancelled, and the power lock icon 80 is displayed or dismissed. Then, the interrupt process shown in FIG. 8 is finished.

The flowchart shown in each of FIG. 6 and FIG. 8 corresponds to both of the power lock execution process executed when the power is not locked (step S9) and the power unlock process executed when the power is locked (step S10). A reason for this is that it is reasonable that the computer program includes both of the processes. However, the flowchart shown in each of FIG. 6 and FIG. 8 is merely an example. For example, a computer program that executes the power lock execution process when the power is not locked (step S9), and a computer program that executes the power unlock process when the power is locked (step S10), may be provided separately. Each of the processes described as a computer program is one of a plurality of preferred embodiments according to the present invention. In the case where separate computer programs are provided, neither of the computer programs includes the determination process in step S8. The process corresponding to step S8 is executed when the second controller 62 determines which program is to be executed.

In the above-described description made with reference to FIG. 6 and FIG. 8, the second controller 62 switches the operation mode to the normal operation mode or to the power lock mode when the switch button 66 is long pressed. Since a button that switches the modes is not separately provided, the number of the buttons in the operation panel 60 is decreased. However, this is merely an example. The second controller 62 may switch the operation mode to the normal operation mode or to the power lock mode when a button different from the switch button 66 is long pressed. The button different from the switch button 66 may be, for example, the assist force setting button 64a or 64b or the headlight button 68. Alternatively, a long press on the power button 70 may be used to switch the operation mode to the normal operation mode or to the power lock mode. In the normal operation made, the power is turned off when the power button 70 is short-pressed.

It is not necessary that one button is commonly used to switch the operation mode to the normal operation mode or to the power lock mode. A button that switches the operation mode to the normal operation mode and a button that switches the operation mode to the power lock mode may be provided separately, or any button may be assigned as such a button. Namely, any button may be used by the second controller 62 to switch the operation mode to the normal operation mode or to the power lock mode when being long pressed.

In the case where a button different from the power button 70 is assigned to switch the operation mode to the normal operation mode or to the power lock button, the following operation may be performed. When the power button 70 is long pressed in the power lock mode, the second controller 62 may turn off the power without returning the operation mode to the normal operation mode.

Still alternatively, a plurality of buttons may be used as follows. For example, when the rider long presses the power button 70 while pressing a button different from the power button 70 in a power-off state, the power is turned on and also the second controller 62 starts operating in the power lock mode. By contrast, when the rider long presses the power button 70 while pressing a button different from the power button 70 in the power lock mode, the power lock mode is cancelled and the power is also turned off. Such a complicated operation is required so that the possibility that the power is turned off inadvertently is further decreased.

Another conceivable method to avoid the power from being turned off inadvertently by a child short-pressing the corresponding button by mistake, the normal operation mode and the power lock mode are not distinguished from each other. For example, in the case where the power button 70 is pressed in a power-off state to turn on the power, the second controller 62 is permitted to turn off the power only when the power button 70 is long pressed. Namely, a short press on the power button 70 does not turn off the power. According to this method, the rider does not need to care whether the current operation mode is the normal operation mode or the power lock mode. Therefore, the operation is simplified, and the rider is not confused or less confused during the operation.

The second controller 62 may light up the LED indicator 66a after the power is turned on. When detecting that the power button 70 is short-pressed, the second controller 62 may blink the power lock icon 80 as described above to notify the rider that the power is not turned off by a short press on the power button 70. The second controller 62 may blink the LED indicator 66a instead of the power lock icon 80. The second controller 62 may also output a notification audio signal from the speaker. It is more preferable to output the notification audio signal while blinking the power lock icon 80 or the LED indicator 66a. Only the notification audio signal may be output.

In the above-described power lock mode, the second controller 62 prohibits the power from being turned off by a short press on the power button 70, but may accept an operation made on any other button.

For example, the second controller 62 may accept an operation on the assist force setting button 64a or 64b to increase or decrease the assist force. In the case where the operation on the assist force setting button 64b is to make the assist force zero, the second controller 62 may prohibit the operation from being accepted. A reason for this is that when the assist force becomes completely zero, the rider needs to keep riding with only human power, and the load on the rider increases. The operation to make the assist force zero is prohibited, so that the rider keeps on riding with an assist force.

Even in the power lock mode, in the case where the headlight 2 is off, the second controller 62 may light up the headlight 2 in response to a normal operation on the headlight button 68. Thus, the rider is allowed to light up the headlight 2 without cancelling the power lock mode, which improves the convenience. In the case where the headlight 2 is on in the power lock mode and a normal operation is made on the headlight button 68, the second controller 62 keeps the headlight 2 on. Namely, the second controller 62 prohibits the headlight 2 from being switched off in the power lock mode. Even when the headlight button 68 is pressed by, for example, a mischievous conduct of a child while the headlight button 68 is on, the headlight 2 is kept on. Therefore, the rider keeps on riding with a sufficient level of brightness.

Preferred embodiments of the present invention are especially useful for an electrically power assisted bicycle including an operation panel and a plurality of (e.g., two or three) wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electrically power assisted bicycle comprising:
   a driving system including an electric motor that generates an assist force to assist human power of a rider and a first controller configured or programmed to control the electric motor; and
   an operation panel including a plurality of buttons and a second controller; wherein
   the plurality of buttons include a power button that turns on or off a power of the driving system, and an assist force setting button that sets an assist force of the electric motor;
   the second controller is configured or programmed to detect pressing of each of the plurality of buttons to execute a predefined process; and
   when the second controller detects a specific operation that is different from a normal operation, in which the button is pressed for less than a predetermined time period, on at least one button among the plurality of buttons while electric power is being supplied to the driving system and the second controller is operated in a normal operation mode, in which each time the power button is pressed the power is alternately turned on and off, the second controller is configured or programmed to prohibit the power from being turned off.

2. The electrically power assisted bicycle according to claim 1, wherein
   the second controller operates in the normal operation mode and a power lock mode;
   in the power lock mode, the power is prohibited from being turned off when the normal operation is performed on the power button; and
   the second controller is configured or programmed to change from the normal operation mode to the power lock mode when detecting the specific operation on the at least one button in the normal operation mode.

3. The electrically power assisted bicycle according to claim 2, wherein the second controller is configured or programmed to change from the normal operation mode to the power lock mode when detecting that the specific operation includes pressing the at least one button for the predetermined time period or longer.

4. The electrically power assisted bicycle according to claim 2, wherein:
   the control panel further includes a display device that displays information on a running state of the electrically power assisted bicycle and includes a switch button that displays the information on the running state in a switchable manner; and
   the second controller is configured or programmed to change from the normal operation mode to the power lock mode when detecting that the specific operation includes pressing the switch button for the predetermined time period or longer.

5. The electrically power assisted bicycle according to claim 4, wherein the display device includes one of a liquid crystal panel, an organic EL panel, and an electric paper panel.

6. The electrically power assisted bicycle according to claim 2, wherein
   the at least one button is the power button; and
   the second controller is configured or programmed to change from the normal operation mode to the power lock mode when detecting that the specific operation includes pressing the power button for the predetermined time period or longer.

7. The electrically power assisted bicycle according to claim 2, wherein the second controller is configured or programmed to change from the normal operation mode to the power lock mode when detecting that the specific operation includes pressing two predefined buttons at the same time.

8. The electrically power assisted bicycle according to claim 7, wherein one of the two predefined buttons is the power button.

9. The electrically power assisted bicycle according to claim 2, wherein, in the power lock mode, the second controller is configured or programmed to prohibit the power from being turned off when the normal operation is performed on the power button, and to accept the normal operation when the normal operation is performed on the assist force setting button.

10. The electrically power assisted bicycle according to claim 9, wherein the second controller is configured or programmed to prohibit an operation performed on the assist force setting button when the operation is to make the assist force of the electric motor zero.

11. The electrically power assisted bicycle according to claim 2, further comprising a headlight; wherein
the operation panel includes a light button that switches on or off the headlight;
the second controller is configured or programmed to switch on the headlight in response to the normal operation on the light button when the headlight is off in the power lock mode; and
the second controller is configured or programmed to keep the headlight on when the headlight is on in the power lock mode and the normal operation is performed on the light button.

12. The electrically power assisted bicycle according to claim 2, wherein:
the operation panel further includes a display device that displays information on a running state of the electrically power assisted bicycle; and
the second controller is configured or programmed to display on the display device an image showing that the electrically power assisted bicycle is in the power lock mode when the normal operation mode is changed to the power lock mode.

13. The electrically power assisted bicycle according to claim 12, wherein the second controller is configured or programmed to change a display manner of the image on the display device when the normal operation is performed on the power button in the power lock mode.

14. The electrically power assisted bicycle according to claim 13, wherein the second controller is configured or programmed to blink the image.

15. The electrically power assisted bicycle according to claim 12, wherein the second controller is configured or programmed to blink a portion or an entirety of a display area of the display device when the normal operation is performed on the power button in the power lock mode.

16. The electrically power assisted bicycle according to claim 2, further comprising a lamp that lights up in the power lock mode wherein
the second controller is configured or programmed to blink the lamp when the normal operation is performed on the power button in the power lock mode.

17. The electrically power assisted bicycle according to claim 12, further comprising a speaker that outputs an audio signal; wherein
the second controller is configured or programmed to output an audio signal from the speaker when the normal operation is performed on the power button in the power lock mode.

18. The electrically power assisted bicycle according to claim 1, wherein the second controller is configured or programmed to accept the specific operation when an electric circuit in the operation panel is detected to be turned on by pressing the at least one button and is detected to be turned off by releasing the at least one button.

19. An electrically power assisted bicycle comprising:
a driving system including an electric motor that generates an assist force to assist human power of a rider and a first controller configured or programmed to control the electric motor; and
an operation panel including a plurality of buttons and a second controller; wherein
the plurality of buttons include a power button that turns on or off a power of the driving system, and an assist force setting button that sets an assist force of the electric motor;
the second controller is configured or programmed to detect a press on each of the plurality of buttons to execute a predefined process; and
the second controller is configured or programmed to turn off the power when detecting a specific operation different from a normal operation, in which the button is pressed for less than a predetermined time period, on at least one button among the plurality of buttons while electric power is being supplied to the driving system.

20. The electrically power assisted bicycle according to claim 19, wherein the second controller is configured or programmed to turn off the power when detecting an operation of pressing the power button for the predetermined time period or longer.

* * * * *